A. BLEILE.
DEVICE FOR REMOVING CAKES FROM CARRIER SHEETS.
APPLICATION FILED DEC. 6, 1917.
1,273,796.
Patented July 23, 1918.
2 SHEETS—SHEET 1.
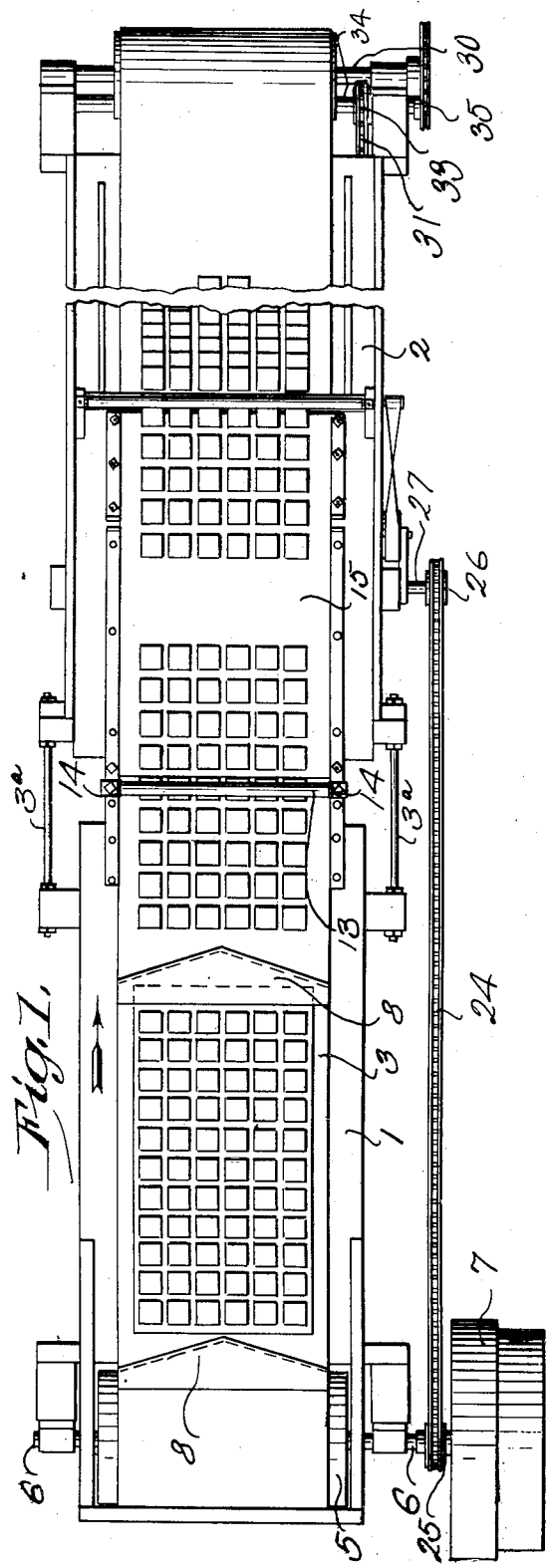
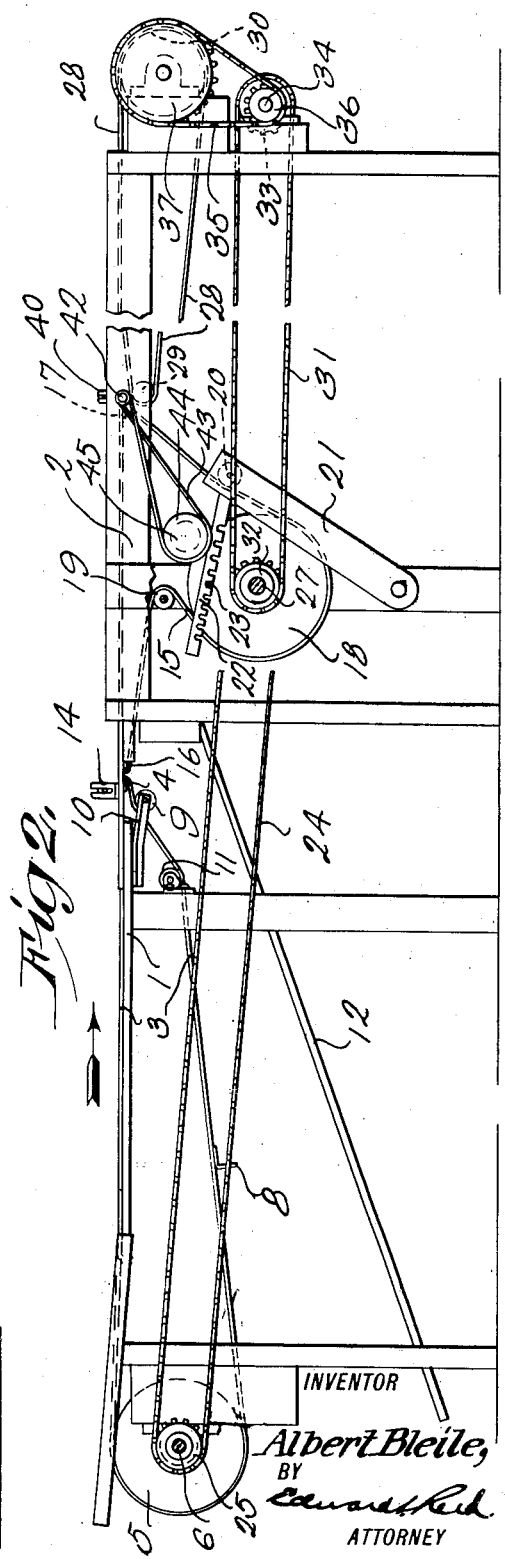
INVENTOR
Albert Bleile,
BY
ATTORNEY

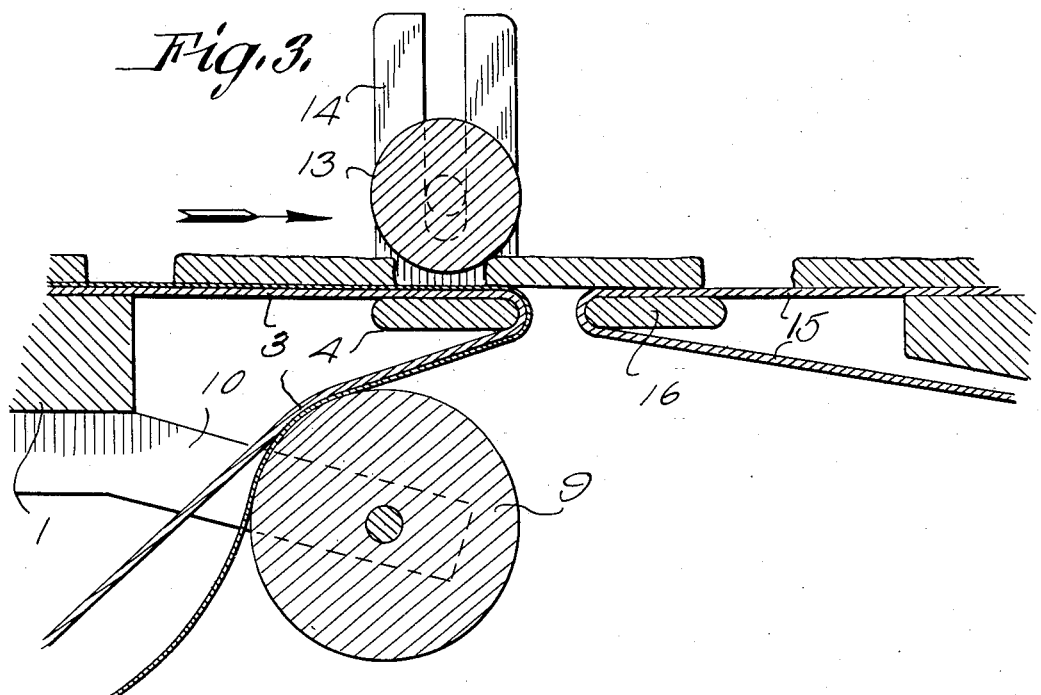
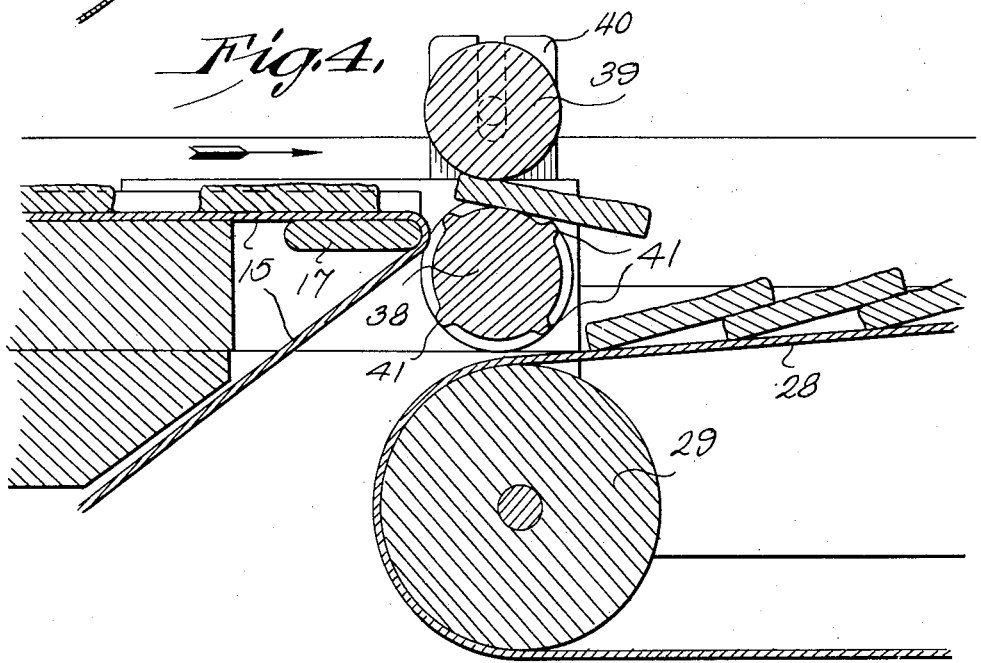

UNITED STATES PATENT OFFICE.

ALBERT BLEILE, OF DAYTON, OHIO.

DEVICE FOR REMOVING CAKES FROM CARRIER-SHEETS.

1,273,796.

Specification of Letters Patent.

Patented July 23, 1918.

Application filed December 6, 1917. Serial No. 205,795.

*To all whom it may concern:*

Be it known that I, ALBERT BLEILE, a citizen of the United States, residing at Dayton, in the county of Montgomery and State of Ohio, have invented certain new and useful Improvements in Devices for Removing Cakes from Carrier-Sheets, of which the following is a specification, reference being had therein to the accompanying drawing.

This invention relates to a device for removing cakes from carrier sheets.

In the manufacture of cakes, or the like, which are coated with chocolate, or other material, it is customary to deliver the coated cakes from the coating machine on the carrier sheets, which are made of paper which has been treated to adapt it to this purpose. The cakes remain on the carrier sheets until the coating has dried and are then removed and packed. The coated cakes adhere to the carrier sheets in such a manner that each cake must be engaged by the hand, or some device, to loosen it, and the removal of each cake individually by hand is a slow and expensive process.

The object of the present invention is to provide mechanism which will operate to rapidly remove the cakes from the carrier sheets without breaking or otherwise injuring the same.

A further object of the invention is to provide such a mechanism which will deliver the cakes, after they have been removed from the carrier sheets, in such relative positions that they can be quickly and easily grasped in bunches by the hand of the packer, thus greatly expediting the work of gathering up and packing the cakes.

A further object of the invention is to provide such a mechanism which will be very simple in its construction and operation and which will operate at a relatively high speed.

In the accompanying drawings Figure 1 is a plan view, partly broken away, of a mechanism embodying my invention; Fig. 2 is a side elevation of the mechanism shown in Fig. 1; Fig. 3 is a sectional view of the separating device proper; and Fig. 4 is a sectional view of the stacker.

In these drawings I have illustrated one embodiment of my invention and have shown a device designed for handling chocolate coated cakes, but it will be understood that the invention can be used, with little or no modification, with cakes, or confections, of various kinds; and further that its use is not limited to edible products. It will, therefore, be understood that the term "cakes" as herein employed is intended to designate the articles acted upon regardless of their specific character.

In the particular embodiment of the invention here illustrated the mechanism is mounted on a structure which comprises two parts, 1 and 2, arranged in longitudinal alinement and connected one to the other by tie rods $3^a$. It will be obvious, however, that the specific character of this structure is not essential to the invention and the mechanism can be mounted in any suitable manner. The mechanism mounted on this structure comprises, preferably, a conveyer with suitable coöperating devices for separating the cakes from the carrier sheets and another conveyer to receive the cakes after they have been separated from the carrier sheets. Suitable devices are provided to coöperate with these conveyers, including devices for operating the conveyers at different speeds, which will cause the cakes to be stacked upon the last-mentioned conveyer in rows in which the cakes overlap each other. The first-mentioned conveyer is mounted on the part 1 of the supporting structure and is here shown as comprising an endless belt 3 which passes about guides at the opposite ends of this part of the supporting structure. These guides may be of any suitable character, but preferably the guide at the forward or discharge end of the conveyer is of a small diameter, or thickness, so that the belt will make a sharp turn about the same, and in the construction here shown this forward guide comprises a flat bar 4 rigidly secured to the supporting structure, or frame. The guide at the rear end of the conveyer is here shown as a roller, or drum, 5, which not only serves as a guide for the conveyer, but serves to drive the same. For this purpose the shaft 6 of the drum 5 projects beyond the side of the supporting structure and is provided with suitable means, such as a belt pulley 7, for connecting it with a source of power. The carrier sheets with the cakes adhering thereto are placed upon the conveyer 3 between the ends thereof so that they will be carried forward with the conveyer. Suitable means are provided for causing the carrier sheets to move about the fixed guide 4 with the conveyer. As here shown the conveyer belt is provided with a series of flaps 8 which are preferably spaced apart a distance slightly greater than the length of the carrier sheets. The forward end of one of the carrier sheets is inserted beneath the edge of one of the flaps 8 and consequently will be caused to move about the guide 4 with the belt. The succeeding carrier sheets may have their forward ends placed beneath the succeeding flaps, or the forward edges of the succeeding sheets may be placed beneath the ends of the next preceding sheets, as this will also cause them to turn about the guide 4. A suitable device is arranged beneath the conveyer to act upon the carrier sheets to cause them to continue their movement with the conveyer until the sheet as a whole has been withdrawn from the upper surface of the conveyer. This device, as here shown, consists of a roller 9 carried by supporting brackets 10 and arranged beneath the lower stretch of the conveyer belt between the guide bar 4 and the fixed guide, or roller, 11, which is arranged above the lower stretch of the belt. The roller 9 is so arranged that it will exert pressure upon the carrier sheet and hold the same in frictional contact with the belt so that it will be caused to move therewith. After the sheet has been entirely withdrawn from the upper surface of the conveyer and passes the roller 9 it is discharged from the conveyer. As here shown an inclined table 12 is provided to receive the sheets and is so arranged that they can be readily removed therefrom. The sharp turn of the carrier sheets about the guide 4 would serve to separate many of the cakes from the carrier sheets, but it would not positively separate all the cakes therefrom, and further the cakes would be given a downward turn and it would be difficult to control the same for stacking, or other purposes. I, therefore, prefer to employ means coöperating with the conveyer to cause the cakes to be positively separated from the carrier sheets and to retain the cakes in such positions that their delivery can be controlled. In the present device I accomplish this by mounting above the forward end of the conveyer, just in the rear of the discharge edge thereof, a roller 13 which is mounted for free vertical movement in slotted brackets 14 arranged at the opposite edges of the belt, or conveyer, and adapted to rest lightly upon the cakes as they pass the same. The character of this roller is such that it will retain the cakes in substantially horizontal positions as the carrier sheet turns about the guide bar 4, thus causing the sheet to be separated from the cakes, but will not crush or otherwise injure the cakes. In this manner the cakes are positively separated from the carrier sheets and are delivered from the separating device in horizontal positions and in the same relative positions which they occupied on the carrier sheets.

The cakes may be delivered from the separating devices proper onto any suitable receiving structure, or receptacle. But, as above stated, the present invention contemplates the arrangement, or stacking, of the cakes so that they can readily be grasped in bunches by the hand of the packers, thus avoiding the necessity of picking up each cake individually. In the present form of the invention the stacking device comprises a conveyer having its upper surface arranged in substantially the same horizontal plane as the upper surface of the conveyer 3 and having its receiving end arranged in such close relation to the discharge end of the conveyer 3 that the cakes will bridge the space between the two conveyers and will be discharged onto the receiving conveyer, while the carrier sheets pass with the conveyer 3 through the space between the ends of the two conveyers. This second conveyer is also shown in the form of an endless belt, 15, which passes at its ends about guide bars 16 and 17 and is driven at approximately the same speed as the conveyer 3 by means of a drum 18 journaled on the supporting structure 2 beneath the upper stretch of the belt and about which the lower stretch of the belt passes, as shown in Fig. 2. Preferably a guide roller 19 is arranged to engage the belt and cause a relatively large portion thereof to contact with the driving pulley, or drum 18. If desired a belt tigthening device may be provided, and in the present instance I have shown such a device as comprising a roller 20 mounted in arms 21 pivotally mounted on the frame or part 2 of the supporting structure, and having connected therewith one or more notched arms 22 adapted to engage a pin, or pins, 23, to cause the roller 20 to exert the desired pressure upon the belt. The driving pulley, or drum, 18, is preferably actuated from the same source of power that drives the conveyer 3 and as here shown a sprocket chain 24 passes about a sprocket wheel 25 on the shaft 6 and about a sprocket wheel 26 on the shaft 27 of the drum 18. The second conveyer 15 need not be of any considerable length and the length shown in the present construction was determined upon to adapt the same to the particular driving mechanism employed. The cakes are delivered by the conveyer 15 to a third conveyer, which is here shown as an endless belt 28 mounted about guides, here shown in the form of rollers, 29 and 30. The roller 30, at that end of the conveyer 28 remote from the conveyer 15 is enlarged to form a driving drum and is preferably driven from the shaft 27 of the drum 18, this being accomplished by means of a sprocket chain 31 passing about a sprocket wheel 32 on the shaft 27 and about a sprocket wheel 33 on a counter shaft 34 arranged beneath the driving drum 30, and connected therewith by means of a second sprocket chain 35 which passes about a second sprocket wheel 36 on the shaft 34 and about a sprocket wheel 37 connected with the driving drum 30. The relative sizes of the sprocket wheels 36 and 37 cause the conveyer 28 to be driven at a speed less than that at which the belts 3 and 15 are moved. The receiving end of the conveyer 28 is arranged in a plane slightly lower than the plane of the conveyer 15, and preferably the conveyer 15 slightly overlaps the conveyer 28. The arrangement of the ends of the belts of the conveyers is such that it is preferable to use a smaller guide roller at the receiving end of the conveyer 28, and it is for this reason that the driving drum 30 is placed at the remote end of this conveyer. The cakes are discharged from the conveyer 15 onto the conveyer 28 and because of the fact that the conveyer 28 moves at a speed somewhat slower than the speed of the conveyer 15 the cakes will be deposited on the conveyer 28 in overlapping positions, as shown in Fig. 4.

I have interposed between the intermediate conveyer 15 and the conveyer 28 a device which will so act upon the cakes that they will be discharged in substantially horizontal positions, thus preventing them from dropping on edge, and which will so discharge the cakes that each cake will be placed upon the belt, or conveyer, 28 well in advance of the succeeding cake, thus preventing the edge of the succeeding cake from engaging the rear edge of the preceding cake at the time it is delivered, and thus interfering with the proper stacking of the cakes. This device, as here shown, consists of a positively driven roller 38 arranged above the receiving end of the conveyer 28 and with which coöperates a holding device, or roller 39, mounted directly above the same for free vertical movement. As here shown this upper roller is loosely mounted in slotted brackets 40. The roller 38 is arranged with its upper surface in substantial alinement with the surface of the conveyer 15 and is so arranged with relation to that conveyer that the cakes will be discharged therefrom between the two rollers and will be acted upon by the two rollers to complete their discharge. The lower roller is driven at a speed which is much higher than the speed at which the conveyer 15 moves, and preferably has its surface roughened or provided with ribs 41, so that the cakes will be discharged quickly, and the upper roller will hold the cakes in substantially horizontal positions until their discharge has been completed, so that they will fall upon the conveyer 28 in substantially horizontal positions. As has been explained the slow movement of the receiving conveyer 28 causes the cakes to fall in overlapping positions. The rapid movement of the discharge, or stacking device, also serves to move the one cake well ahead of the following cake so that there is no danger of their being engaged thereby before it has assumed its final position on the conveyer 28. The roller 38 may be driven in any suitable manner, but in the present instance I have driven it from the drum 18 for the second, or intermediate, conveyer. To this end the shaft of the roller is provided with a small pulley 42 which is connected by a belt 43 with a pulley 44 on the end of a shaft or roller 45, which rests upon and is rotated by the drum 18.

The operation of the device will be readily understood from the foregoing description and it will be apparent that the mechanism is such as to very rapidly and positively separate the cakes from the carrier sheets and stack them in rows on a receiving conveyer, the number of rows corresponding to the number of rows of cakes on the carrier sheets, and will accomplish this without in any way injuring the cakes. Further, the separation and the stacking of the cakes is accomplished without turning the same and they are, therefore, stacked on the receiving conveyer right side up, thus further facilitating the packing of the cakes. The device is very simple in its construction and operation and requires little or no attention to maintain it in operative condition, and it can be operated at a very small expense.

While I have shown and described one embodiment of my invention I wish it to be understood that I do not desire to be limited to the details of construction as various modifications will occur to a person skilled in the art.

Having now fully described my invention, what I claim as new and desire to secure by Letters Patent, is:—

1. In a mechanism of the character described, a guide, a conveyer passing about said guide, adapted to receive a sheet containing cakes and to carry said sheet about said guide, a cake receiving structure at that end of said conveyer adjacent to said guide, and a cake engaging device to prevent the cakes from turning about said guide.

2. In a mechanism of the character described, a guide, a conveyer passing about said guide and adapted to receive a carrier sheet containing cakes, and means to retain the cakes in a substantially horizontal position while the carrier sheet moves with the conveyer about said guide, thus causing the cakes to be separated from the sheet.

3. In a mechanism of the character described, a guide, a conveyer passing about said guide and adapted to receive a carrier sheet containing cakes, and a roller to normally engage said cakes near the discharge end of said conveyer and hold the same against turning movement while the carrier sheet moves with the conveyer about said guide, thus causing the cakes to be separated from the carrier sheet.

4. In a mechanism of the character described, a guide, a conveyer passing about said guide and adapted to receive a carrier sheet containing cakes, a cake receiving structure at the end of said conveyer adjacent to said guide, and means to cause the cakes on said carrier sheet to move in a substantially horizontal position onto said cake receiving structure while said carrier sheet travels with said conveyer about said guide.

5. In a mechanism of the character described, a guide, a conveyer passing about said guide and adapted to receive a carrier sheet containing cakes, a cake receiving structure at the end of said conveyer adjacent to said guide, and a roller arranged above said guide near that end of said conveyer adjacent to said cake receiving structure to normally engage the cakes and retain them in a substantially horizontal position until the forward edges thereof have engaged said receiving structure.

6. In a mechanism of the character described, a guide, a conveyer passing about said guide and adapted to receive a carrier sheet containing cakes, means to retain the cakes in a substantially horizontal position while the carrier sheet moves with the conveyer about said guide, and means to cause the carrier sheet to move with said conveyer until it has completely passed said guide.

7. In a mechanism of the character described, a guide, a conveyer passing about said guide and adapted to receive a carrier sheet containing cakes, a cake receiving structure arranged adjacent to, but spaced away from, the end of said conveyer adjacent to said guide, means to cause the cakes on said carrier sheet to bridge the space between said conveyer and said structure, and means to connect the carrier sheet with the conveyer to cause it to move about said guide therewith.

8. In a mechanism of the character described, a guide, a conveyer passing about said guide and adapted to receive a carrier sheet containing cakes, a cake receiving structure arranged adjacent to, but spaced away from, the end of said conveyer adjacent to said guide, means to cause the cakes on said carrier sheet to bridge the space between said conveyer and said structure, and a roller adjacent to said conveyer beyond said guide to hold the carrier sheet in frictional contact therewith.

9. In a mechanism of the character described, a conveyer adapted to receive a carrier sheet containing cakes, means to remove the cakes from said carrier sheet, another conveyer to receive the cakes after they have been removed from said carrier sheet, and means to cause the cakes to be delivered onto the last-mentioned conveyer in overlapping engagement one with the other.

10. In a mechanism of the character described, a conveyer adapted to receive a carrier sheet containing cakes, means to remove the cakes from said carrier sheet, another conveyer to receive the cakes after they have been removed from said carrier sheet, a device to deliver cakes to the last-mentioned conveyer, said last-mentioned conveyer having its receiving end arranged beyond and slightly below the level of the discharge end of the delivering device, and means for actuating said last-mentioned conveyer at a speed less than the speed at which the cakes are delivered thereto, whereby the cakes will be discharged onto the last-mentioned conveyer in overlapping positions.

11. In a mechanism of the character described, a conveyer adapted to receive a carrier sheet containing cakes, means to remove the cakes from said carrier sheet, another conveyer arranged beyond the first-mentioned conveyer and adapted to receive the cakes after they have been removed from said carrier sheet, and a device coöperating with said conveyers to cause each cake to be deposited on the last mentioned conveyer with its forward edge overlapping the rear edge of the preceding cake.

12. In a mechanism of the character described, a conveyer adapted to receive a carrier sheet containing cakes, means to remove the cakes from said carrier sheet, another conveyer arranged beyond the first-mentioned conveyer and adapted to receive the cakes after they have been removed from said carrier sheet, and a pair of rollers interposed between said conveyers to discharge the cakes onto said last-mentioned conveyer in substantially horizontal positions.

13. In a mechanism of the character described, a conveyer adapted to receive a carrier sheet containing cakes, means to remove the cakes from said carrier sheet, another conveyer arranged beyond and moving at a speed less than the speed of the first-mentioned conveyer, and a pair of rollers interposed between said conveyers and arranged above the last-mentioned conveyer to cause the cakes to be discharged in substantially horizontal positions on said last-mentioned conveyer.

14. In a mechanism of the character described, a conveyer adapted to receive a carrier sheet having cakes mounted thereon in parallel rows, means to remove the cakes from the carrier sheet, another conveyer to receive the cakes after they have been removed from the carrier sheet, said last-mentioned conveyer being actuated at a speed less than the speed of the first-mentioned conveyer, and a device coöperating with said conveyers to discharge the cakes to said last-mentioned conveyer in substantially parallel rows and to cause each succeeding cake of each row to overlap the preceding cake of that row.

15. In a mechanism of the character described, a conveyer for cakes, a second conveyer arranged beyond the first-mentioned conveyer, a pair of rollers interposed between said conveyers and arranged to receive the cakes from the first-mentioned conveyer, and means for driving one of said rollers at a relatively high speed to cause the cakes to be discharged onto the last-mentioned conveyer.

16. In a mechanism of the character described, a conveyer for cakes, a conveyer arranged beyond the first-mentioned conveyer and on a lower level than the first-mentioned conveyer, a pair of rollers arranged above the receiving end of the last-mentioned conveyer and positioned to receive the cakes from the first-mentioned conveyer, means for actuating the last-mentioned conveyer at a speed less than the speed of the first-mentioned conveyer, and means for driving one of said rollers at a relatively high speed.

17. In a mechanism of the character described, a conveyer adapted to receive a carrier sheet containing cakes, a guide at one end of said conveyer about which the conveyer and carrier sheet are moved, means to retain the cakes in substantially horizontal positions while the carrier sheet moves about said guide, another conveyer to receive the cakes after they have been removed from said carrier sheet, and means to cause the cakes to be delivered onto the last-mentioned conveyer in overlapping positions.

18. In a mechanism of the character described, a conveyer adapted to receive a carrier sheet containing cakes, a guide at one end of said conveyer about which the conveyer and carrier sheet are moved, means to retain the cakes in substantially horizontal positions while the carrier sheet moves about said guide, another conveyer to receive the cakes after they have been removed from said carrier sheet, means for actuating said last-mentioned conveyer at a speed less than the speed of the first-mentioned conveyer, and devices interposed between said conveyers to cause the cakes to be delivered to the last-mentioned conveyer in substantially horizontal positions.

19. In a mechanism of the character described, a conveyer adapted to receive a carrier sheet containing cakes, means to remove the cakes from said carrier sheet, a second conveyer to receive the cakes from the first-mentioned conveyer after they have been removed from the carrier sheet, a third conveyer to receive the cakes from the second conveyer, and means to cause the cakes to be delivered onto said third-mentioned conveyer in overlapping engagement one with the other.

20. In a mechanism of the character described, a conveyer adapted to receive a carrier sheet containing cakes, means to remove the cakes from said carrier sheet, a second conveyer to receive the cakes from the first-mentioned conveyer after they have been removed from the carrier sheet, a third conveyer to receive the cakes from the second conveyer, a device coöperating with said second conveyer to cause the cakes to be delivered onto said third conveyer in substantially horizontal positions, and means for actuating said third conveyer at a speed less than the speed of the second conveyer, whereby the cakes will be delivered to said conveyer in overlapping positions.

21. In a mechanism of the character described, a conveyer adapted to receive a carrier sheet containing cakes, a guide at one end of said conveyer about which the conveyer and the carrier sheet are moved, means to retain the cakes in substantially horizontal positions while the carrier sheet moves about said guide, another conveyer to receive the cakes after they have been moved from said carrier sheet, devices to cause the cakes to be delivered to the last-mentioned conveyer in substantially horizontal positions, and means for actuating said last-mentioned conveyer at a speed less than the speed at which said cakes are delivered thereto.

22. In a mechanism of the character described, a conveyer for cakes, a conveyer arranged beyond and on a lower level than the first-mentioned conveyer and adapted to receive the cakes therefrom, and means to actuate the last-mentioned conveyer at a speed less than the speed at which the cakes are delivered thereto, whereby the cakes are deposited on said last-mentioned conveyer in overlapping engagement one with the other.

23. In a mechanism of the character described, a conveyer for cakes, a conveyer arranged beyond and on a lower level than the first-mentioned conveyer and adapted to receive cakes therefrom, means to cause cakes to be discharged from the first-mentioned conveyer in substantially horizontal positions, and means to actuate the last-mentioned conveyer at a speed less than the speed at which the cakes are delivered thereto.

In testimony whereof I affix my signature hereto.

ALBERT BLEILE.